(12) United States Patent
Fernandez et al.

(10) Patent No.: US 8,844,871 B2
(45) Date of Patent: Sep. 30, 2014

(54) AIRCRAFT FUSELAGE STRUCTURAL COMPONENTS AND METHODS OF MAKING SAME

(71) Applicant: Embraer S.A., São José dos Campos (BR)

(72) Inventors: Fernando Ferreira Fernandez, São José dos Campos (BR); Sadao Takanashi, São José dos Campos (BR); Lucio Camargo Fortes, São José dos Campos (BR); Marcio Cruz, São José dos Campos (BR); Marcelo Galvão do Prado, São José dos Campos (BR); Clovis Augusto Eça Ferreira, São José dos Campos (BR); José Donizette Aguiar, São José dos Campos (BR)

(73) Assignee: Embraer S.A., Sao Jose Dos Campos-SP (BR)

( * ) Notice: Subject to any disclaimer, the term of this patent is extended or adjusted under 35 U.S.C. 154(b) by 0 days.

(21) Appl. No.: 13/645,398

(22) Filed: Oct. 4, 2012

(65) Prior Publication Data
US 2013/0043346 A1    Feb. 21, 2013

Related U.S. Application Data

(62) Division of application No. 12/111,825, filed on Apr. 29, 2008, now abandoned.

(51) Int. Cl.
*B64C 1/06*    (2006.01)

(52) U.S. Cl.
USPC ............................................. 244/119

(58) Field of Classification Search
USPC ................. 244/119, 117 R, 132, 123.1
See application file for complete search history.

(56) References Cited

U.S. PATENT DOCUMENTS

| | | | |
|---|---|---|---|
| 4,310,132 A | 1/1982 | Robinson et al. |
| 5,242,523 A | 9/1993 | Willden et al. |
| 5,893,534 A | 4/1999 | Watanabe |
| 6,302,315 B1 | 10/2001 | Thompson |
| 6,511,570 B2 | 1/2003 | Matsui |
| 6,648,273 B2 | 11/2003 | Anast |
| 6,722,556 B2 | 4/2004 | Schilling et al. |
| 7,074,474 B2 | 7/2006 | Toi et al. |
| 7,134,629 B2 | 11/2006 | Johnson et al. |

(Continued)

*Primary Examiner* — Tien Dinh
(74) *Attorney, Agent, or Firm* — Nixon & Vanderhye P.C.

(57) ABSTRACT

Aircraft fuselage structures have reinforcement members in the vicinity of the stringer openings formed in frame members and are rigidly lap joined to a surface region of the frame members by a friction stir weld region. Such aircraft fuselage structural components may thus be provided with plural longitudinally spaced-apart frame members defining a transversal cross-section of an aircraft fuselage section, the frame members having a plurality of stringer holes therethrough, and plural longitudinally oriented stringers each being positioned within a respective one of the stringer holes of the frame member. The reinforcement members are lap joined to corresponding surfaces of frame members in the vicinity of the stringer holes such that the reinforcement members are joined rigidly to the corresponding surfaces of the frame members by a friction stir weld region.

6 Claims, 6 Drawing Sheets

(56) References Cited

U.S. PATENT DOCUMENTS

| | | |
|---|---|---|
| 7,225,966 B2 | 6/2007 | Christner |
| 7,240,821 B2 | 7/2007 | Talwar |
| 7,963,477 B2 * | 6/2011 | Soula et al. .................. 244/1 A |
| 7,967,250 B2 | 6/2011 | Lobato et al. |
| 2005/0247756 A1 | 11/2005 | Frazer et al. |
| 2006/0054666 A1 | 3/2006 | Ehrstrom et al. |
| 2010/0237195 A1 | 9/2010 | Stephan |

* cited by examiner

AIRCRAFT FUSELAGE STRUCTURAL COMPONENTS AND METHODS OF MAKING SAME

CROSS-REFERENCE

This application is a divisional of commonly owned co-pending U.S. application Ser. No. 12/111,825, filed Apr. 29, 2008, the entire content of which is hereby incorporated by reference.

FIELD OF THE INVENTION

The present invention relates generally to structural components for aircraft fuselages and methods of making the same. In preferred embodiments, the present invention relates to structural panels for aircraft fuselages formed of transversal frame members and longitudinal stringers whereby stringer holes through the frame members are structurally reinforced.

BACKGROUND OF THE INVENTION

An aircraft fuselage is typically constructed as a series of longitudinally spaced circumferential frame members which define the general transversal (cross-sectional) fuselage shape, and a series of spaced stringer members running longitudinally with respect to the aircraft fuselage which contribute to the stiffness of the external skin. Together, the frames and stringers constitute a robust internal structure that provides support to the external fuselage skin.

The fuselage skin covers various members of the internal support structure and is typically formed of a single piece or separate pieces of relatively thin material joined to the internal frames and stingers with skin splice straps. The frames and stringers are attached to the skin using different techniques. Usually, the stringers are installed to the skin in an earlier stage of the manufacturing cycle, using rivets and/or adhesives, to form stiffened skin panels. In a later stage, the stiffened skin panels are spliced and attached to the frames. The corresponding segments of the frames may be installed with each stiffened skin panel, forming framed stiffened skin panels. In a subsequent stage, the framed stiffened skin panels are assembled, and the skins and frames spliced to form a fuselage section. These stages are repeated until the fuselage is constructed.

For those fuselage designs which have the frame members attached directly to the skin, there is a requirement that transverse openings need to be formed at appropriate locations to allow the stringers to pass therethrough. These openings, colloquially termed "mouse holes", impose severe penalties on the strength of the frame members. As such, it is necessary to reinforce the frame members at the stringer openings in order to restore the frame member's original design strength.

Various techniques can be found in the prior art regarding how to structurally strengthen stringer openings formed in fuselage frame members. For example, reinforcement members have been proposed to be riveted to the frame member in the vicinity of the stringer openings. However, this prior riveting technique has the disadvantage that the frame member must be drilled in order to accommodate the rivets, thereby sacrificing some of the frame member's structural integrity and strength. Alternatively, bonding a reinforcement piece has been proposed but this technique has the disadvantage that the reinforcement piece does not possess the same material strength compared to the frame member. Prior strengthening techniques are evident in U.S. Pat. Nos. 4,310, 132; 6,648,273 and 7,134,629, the entire content of each being expressly incorporated hereinto by reference.

It would be desirable if stringer openings could be reinforced without the need for riveting and/or bonding of the reinforcement piece to the frame member. It is towards fulfilling such need that the present invention is directed.

SUMMARY OF THE INVENTION

Broadly the present invention is embodied in aircraft fuselage structures having reinforcement members in the vicinity of the stringer openings formed in frame members and rigidly lap joined to a surface region of the frame members by a friction stir weld region (e.g., a weld region formed by a friction stir welding process).

According to some embodiments, an aircraft fuselage structural component is provided which comprises plural longitudinally spaced-apart frame members defining a transversal cross-section of an aircraft fuselage section, the frame members having a plurality of stringer holes therethrough, and plural longitudinally oriented stringers positioned within respective ones of the stringer holes of the frame member. The reinforcement members are most preferably formed of the same metal as the frame members to whom they are joined. In this regard, the reinforcement members are lap joined to corresponding surfaces of frame members in a vicinity of the stringer holes in such a way that the reinforcement members are joined rigidly to the corresponding surfaces of the frame members by a friction stir weld region. Certain embodiments of the invention will include reinforcement members which comprise a continuous or discontinuous structure. A fuselage skin may be attached to the frame members and/or stringers.

According to some embodiments, the friction stir weld region is a continuous friction stir weld line. Alternatively or additionally, spot and/or discontinuous friction stir welds (with or without tool exit holes) may be employed.

In some embodiments, the reinforcement members comprise an L-shaped flanged structure having one flange rigidly lap joined to a corresponding surface region of the frame member by the friction stir weld region. Alternatively or additionally, the reinforcement members comprise one of a curved plate rigidly lap joined to a corresponding surface region of the frame member by the friction stir weld region.

The reinforcement members may be in the form of a reverse S-shaped structural member having a flange rigidly lap joined to a corresponding surface region of the frame member by the friction stir weld region. The flange of the S-shaped structural member may be rigidly lap joined to flange of the frame member. Alternatively, the flange of the S-shaped structural member may be rigidly lap joined to a center span of the frame member.

The reinforcement members may alternatively or additionally comprise a reinforcement bar positioned laterally of a stringer opening and rigidly lap joined to a corresponding surface region of the frame member by the friction stir weld region.

According to other embodiments of the invention, methods of making an aircraft fuselage structural component are provided which comprise providing plural longitudinally spaced-apart frame members defining a transversal cross-section of an aircraft fuselage section, the frame members having a plurality of stringer holes therethrough, positioning plural longitudinally oriented stringers within respective ones of the stringer holes of the frame members. Such stringer holes are structurally reinforced by lap joining reinforcement members to corresponding surfaces of frame members in the vicinity of the stringer holes. The reinforcement members are friction stir welded rigidly to the corresponding surfaces of the frame members to form a friction stir weld region therebetween.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein similar reference numerals throughout the various FIGURES denote similar structural elements, and wherein.

DETAILED DESCRIPTION OF THE INVENTION

Figure 1:
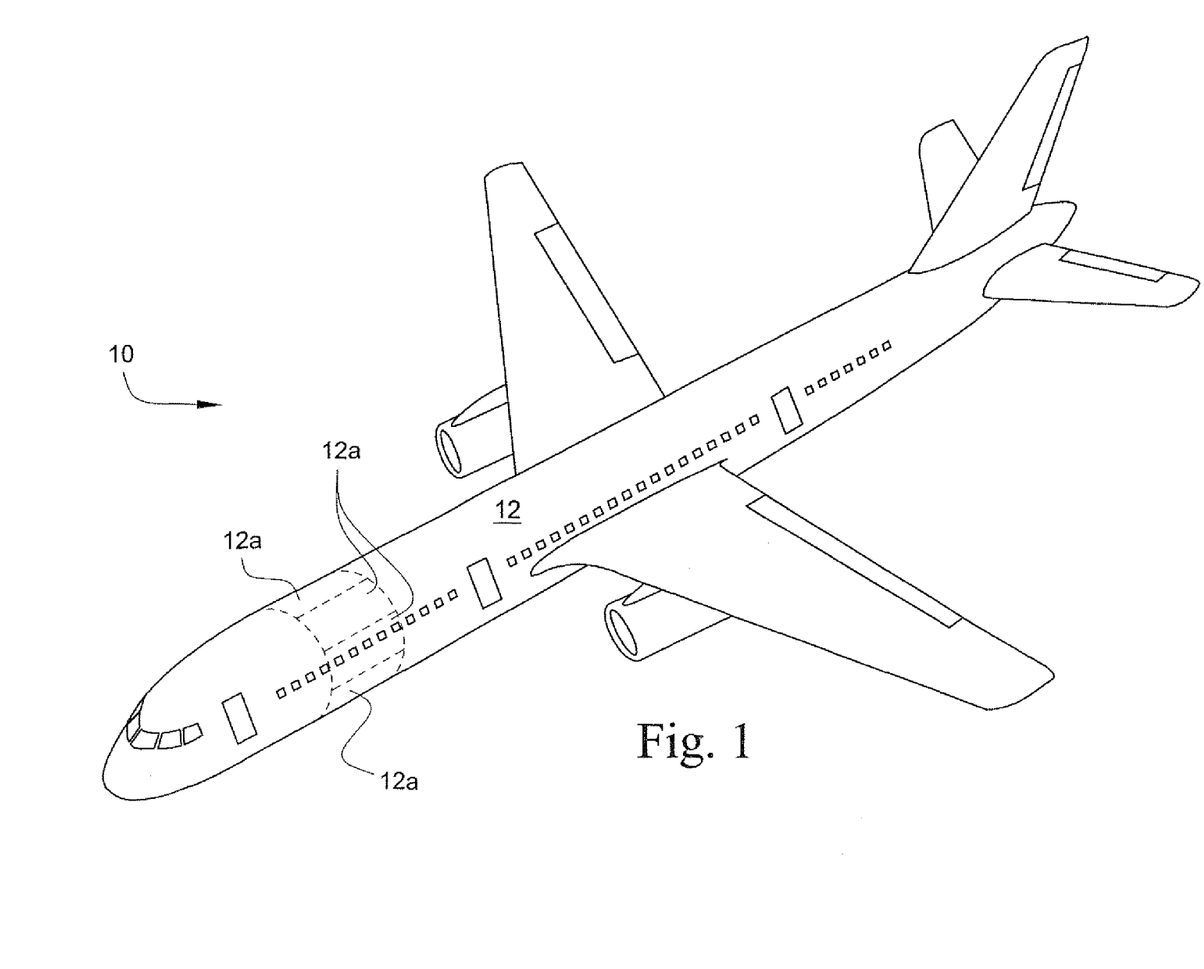
FIG. 1 is a perspective view of an aircraft which includes a structural panel in accordance with an embodiment of the present invention.

Accompanying FIG. 1 depicts an aircraft 10 which includes a fuselage 12 constructed of a number of conjoined structural panels 12a which embody the present invention. It is understood of course that FIG. 1 only shows a representative number of such panels 12a. Thus, substantially the entirety of the fuselage will be formed of panels 12a joined together.

Figure 2:
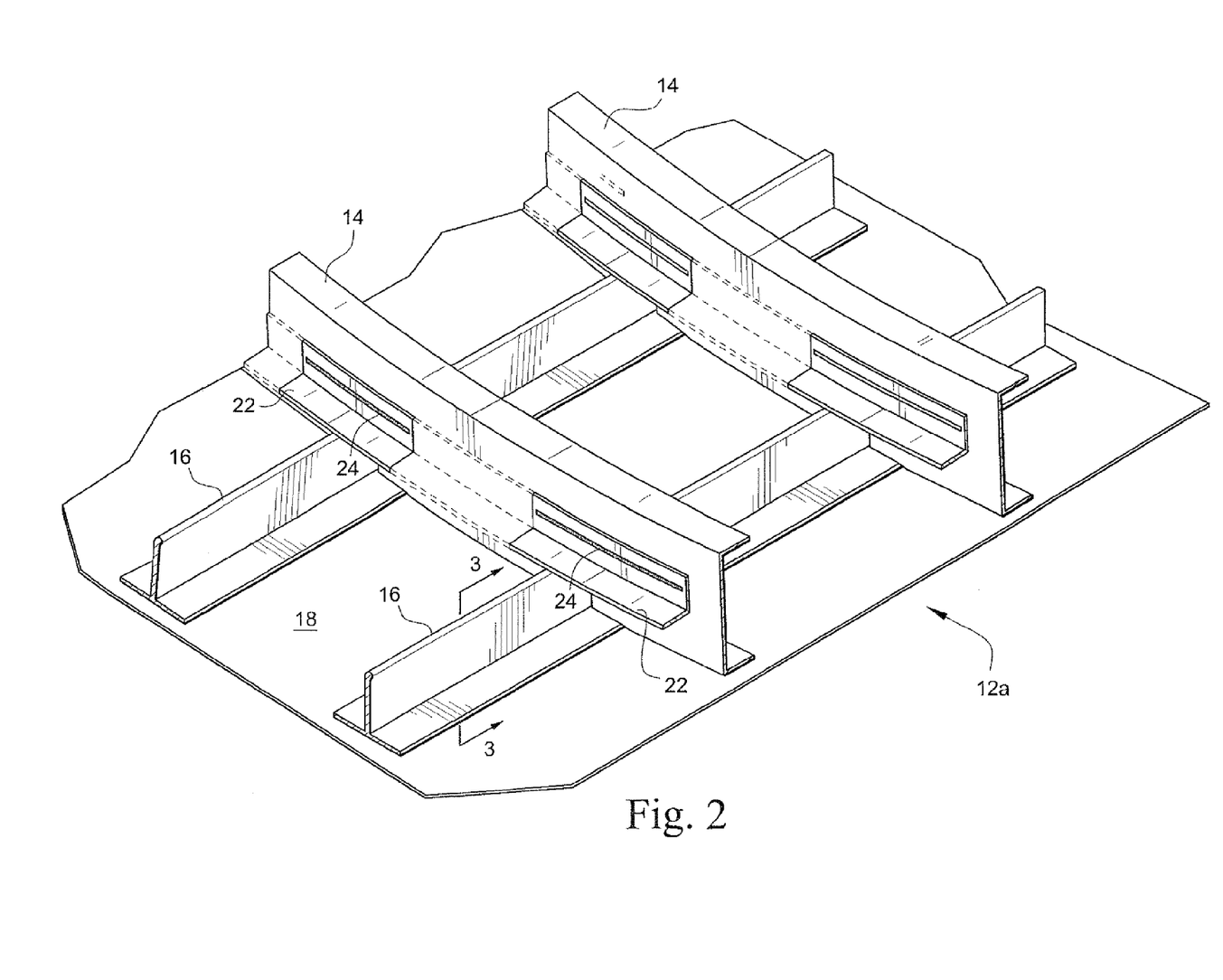
FIG. 2 is more detailed perspective view of a structural panel portion in accordance with an embodiment of the present invention.
Figure 3:
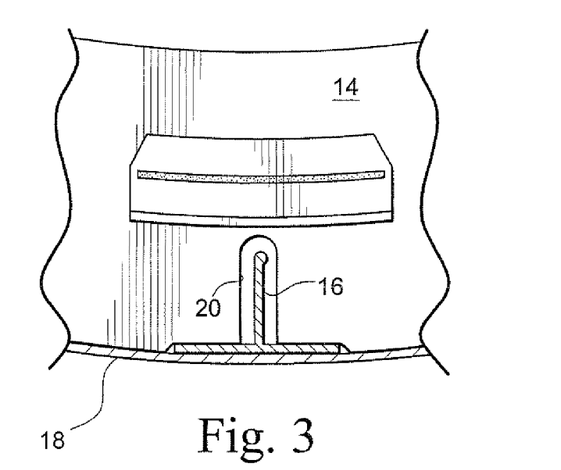
FIG. 3 is a cross-sectional elevational view of the structural panel depicted in FIG. 2 as taken along line 3-3 therein.

As is shown in greater detail in accompanying FIGS. 2 and 3, each structural panel 12a is formed of longitudinally spaced-apart circumferential frame members 14 which define the general transversal (cross-sectional) shape of the fuselage 12, and a series of spaced apart stringer members 16 running longitudinally with respect to the aircraft fuselage 12. The frame and stringer members 14, 16, respectively, are attached directly to the fuselage skin 18 by any suitable means, such as riveting, bonding and the like.

As shown in FIG. 3, a stringer opening 20 is defined in the frame members 14 in registry with the location of individual stringer members 16 so as to allow the latter to pass physically through the former. In order to restore structural strength and integrity to the frame members 14, which were compromised by the openings 20, a reinforcement member 22 is overlapped with a corresponding surface region of the frame member 14 in the vicinity of the opening 20 thereby forming a lap joint. The reinforcement member 22 is shown in FIG. 3 in the form of a flanged L-shaped structure, but as will become evident from the discussion below, other structural forms of reinforcement members 22 are equally effective. One flange of the reinforcement member 22 is thus lap joined with and rigidly affixed to an overlapped surface region of the frame member 14 by means of a friction stir welding (FSW) process along a lap joined weld region 24. The other flange of the reinforcement member extends outwardly at right angle from the overlapped surface region of the frame member 14. In such a manner, structural reinforcement is provided to the frame member 14 in the vicinity of the stringer opening 20.

The reinforcement members 22 may be discontinuous as shown in solid line in FIGS. 2 and 3 in which case they are located superiorly adjacent to a respective opening 20. Alternatively, as shown in dashed line in FIG. 2, the reinforcement member 22 may be a continuous structural member coextensive with the frame members 14.

Virtually any FSW process may be employed to provide the lap joint friction stir weld region 24 joining rigidly the reinforcement members 22 to an overlapped surface region of a respective frame member 22. In preferred embodiments according to the present invention, the friction stir weld region is a continuous weld which may or may not include a corresponding FSW process tool exit hole. As shown in the accompanying FIGURES, the friction stir weld region 24 is formed without a tool exit hole, that is, having the tool exit hole filled (e.g., as disclosed in U.S. Pat. No. 6,722,556, the entire content of which is expressly incorporated hereinto by reference). Friction stir spot welding (FSSW) or segmented friction stir welding (SFSW) (again with or without respective tool exit holes) may also be employed to form the friction stir weld region 24. Suitable FSW processes to form lap joined friction stir weld regions are more fully disclosed in U.S. Pat. Nos. 7,225,966 and 7,240,821, the entire content of each being expressly incorporated hereinto by reference.

Figure 4:
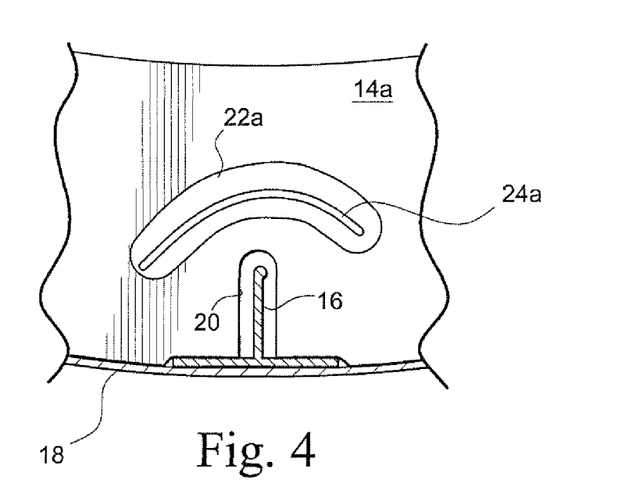
FIGS. 4-7 are cross-sectional elevational views comprising other exemplary embodiments of a structural panel in accordance with the present invention.
Figure 5:
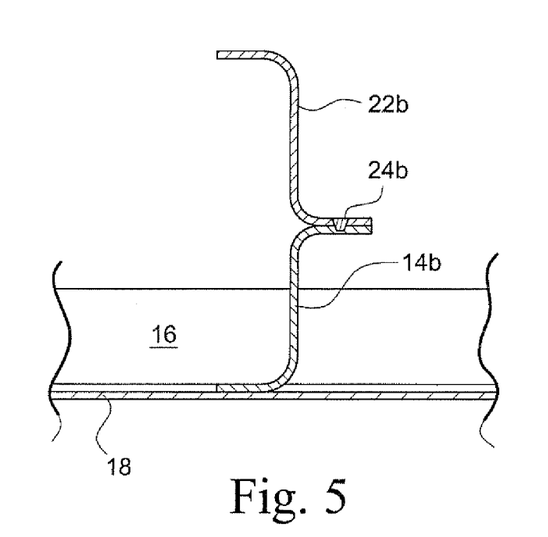

Alternative embodiments of frame reinforcement structures are depicted in accompanying FIGS. 4-9. In this regard, as shown in FIG. 4, the reinforcement member 22a is lap joined to the surface of the frame member 14a in the form of a curved plate superiorly adjacent to the frame opening 20. A centrally located lap joined friction stir weld region 24a thus rigidly joins the reinforcement member 22a to a surface region of the frame member 14a. In the embodiment depicted in FIG. 5, the frame member 14b has a generally S-shaped cross-section (as compared to the generally C-shaped cross-section of frame member 14 depicted in FIGS. 2 and 3). A mirror image (reverse) S-shaped cross-section reinforcement member 22b is positioned above the frame member 14b and includes a flange surface region lap joined by means of a FSW process to an overlapped flange surface region of the frame member 14b to thereby form a friction stir weld region 24b.

Figure 6:
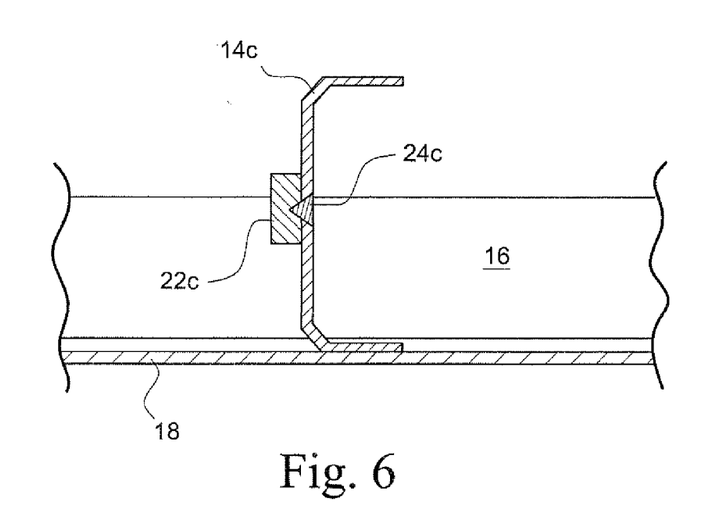

In the embodiment depicted in FIG. 6, a frame member 14c having a generally C-shaped cross-section includes a reinforcement bar 22c lap joined to a surface thereof. The thus lap joined reinforcement bar 22c and frame member 14c are rigidly joined to one another laterally adjacent the stringer hole 20 (not shown in FIG. 6, but see FIG. 3 for reference).

Figure 7:
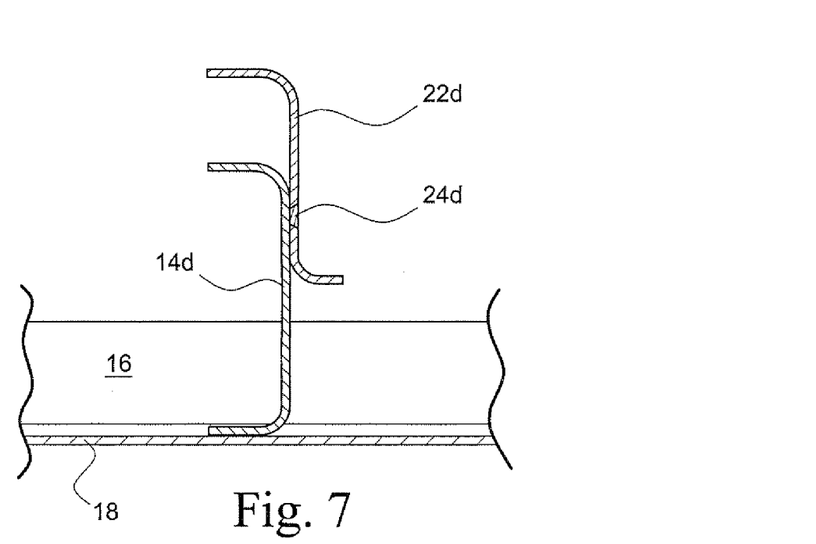

The embodiment depicted in FIG. 7 includes a cross-sectionally reverse S-shaped reinforcement member 22d overlapped with a center span region of a cross-sectionally reverse C-shaped frame member 14d by means of a lap joined friction stir weld region 24b formed with a FSW process.

Figure 8:
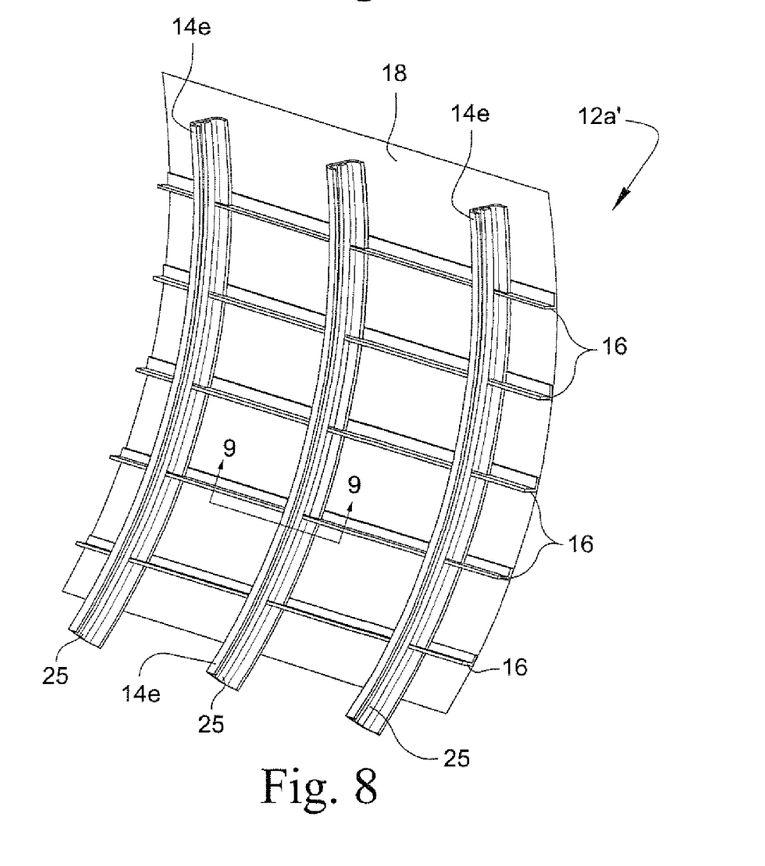
FIG. 8 is a perspective view of another structural panel portion in accordance with another embodiment of the present invention.

The structural panel 12a' depicted in accompanying FIG. 8 is formed of longitudinally spaced-apart frame members 14e defining respective stringer openings through which respective longitudinal stringers 16 pass. The frame members 14e and stringers 16 are attached to the fuselage skin 18 by any suitable means, such as riveting, bonding and the like.

Figure 9:
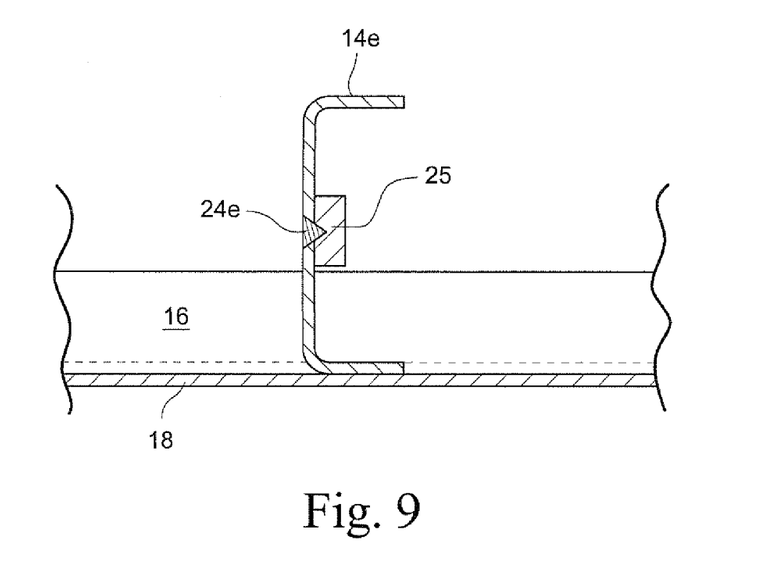
FIG. 9 is an enlarged cross-sectional view of the aircraft structural panel shown in FIG. 8 taken along line 9-9 therein.

As shown in FIG. 9, the frame members 14e are most preferably a C-shaped structural element. A continuous reinforcement bar 25 is rigidly attached to an inner surface of the frame member 14e by means of a FSW process to thereby form a friction stir weld region 24e. In such a manner, the stringer opening through which the frame member 14e passes is structurally reinforced by the reinforcement bar 25.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An aircraft fuselage structural component comprising:

plural longitudinally spaced-apart cross-sectionally reverse C-shaped frame members defining a transversal cross-section of an aircraft fuselage section, the frame members having a center span and spaced-apart upper and lower flanges oriented in a same direction, the frame members defining a plurality of stringer holes therethrough;

plural longitudinally oriented stringers, each of the stringers being positioned within a respective one of the stringer holes of the frame members; and plural cross-sectionally reverse S-shaped reinforcement members each having an intermediate flange lap joined by a friction stir weld region to the center span of a corresponding one of the cross-sectionally reverse C-shaped frame members in a vicinity of the stringer holes thereof, wherein an upper flange of each reverse S-shaped structural member is spaced above and oriented in the same direction as the upper flange of the corresponding one of the cross-sectionally reverse C-shaped frame members to which the structural member is lap joined, and wherein a lower flange of each reverse S-shaped structural member is spaced above and extends in an opposite direction relative to the lower flange of the corresponding one of the cross-sectionally reverse C-shaped frame members to which the structural member is lap joined.

2. The component of claim 1, further comprising a skin attached to the frame members and/or stingers.

3. The component of claim 1, wherein the friction stir weld region is a continuous friction stir weld line.

4. A method of making an aircraft fuselage structural component comprising:

(a) providing plural longitudinally spaced-apart cross-sectionally reverse C-shaped frame members defining a transversal cross-section of an aircraft fuselage section, the frame members having a center span and spaced-apart upper and lower flanges oriented in a same direction, the frame members defining a plurality of stringer holes therethrough;

(b) positioning each of a plurality of longitudinally oriented stringers within a respective one of the stringer holes of the cross-sectionally reverse C-shaped frame members;

(c) structurally reinforcing the stringer holes by lap joining an intermediate flange of cross-sectionally reverse S-shaped structural reinforcement members to the center span of a corresponding one of the cross-sectionally reverse C-shaped frame members in a vicinity of the stringer holes such that an upper flange of each cross-sectionally reverse S-shaped structural reinforcement member is spaced above and oriented in the same direction as the upper flange of the corresponding one of the cross-sectionally reverse C-shaped frame members to which the structural reinforcement member is lap joined, and such that a lower flange of each reverse S-shaped structural member is spaced above and extends in an opposite direction relative to the lower flange of the corresponding one of the cross-sectionally reverse C-shaped frame members to which the structural member is lap joined, and (d) friction stir welding the intermediate flange of the cross-sectionally reverse S-shaped structural reinforcement members rigidly to the center span of the corresponding one of the cross-sectionally reverse C-shaped frame members to form a friction stir weld region therebetween.

5. The method of claim 4, further comprising attaching a skin to the frame members and/or stingers.

6. The method of claim 4, wherein the step of friction stir welding forms a continuous friction stir weld line.

* * * * *